United States Patent [19]

Tanaka

[11] Patent Number: 5,063,484
[45] Date of Patent: Nov. 5, 1991

[54] REMOTE CONTROL UNIT
[75] Inventor: Kouji Tanaka, Furukawa, Japan
[73] Assignee: Alps Electric Co., Ltd., Tokyo, Japan
[21] Appl. No.: 684,617
[22] Filed: Apr. 12, 1991
[30] Foreign Application Priority Data Jul. 26, 1990 [JP] Japan ............................... 2-78721[U]

[51] Int. Cl.⁵ .............................................. F21V 33/00
[52] U.S. Cl. ...................................... 362/109; 362/23;
362/157; 362/253; 341/23; 358/194.1;
340/825.69
[58] Field of Search ................ 358/194.1; 340/825.69;
362/23, 28, 85, 109, 157, 234, 253, 800, 29;
341/22, 23

[56]   References Cited
    U.S. PATENT DOCUMENTS

| | | | |
|---|---|---|---|
| 4,636,593 | 1/1987 | Novak et al. | 200/5 A |
| 4,745,397 | 5/1988 | Lagerbaver et al. | 341/23 |
| 4,855,746 | 8/1989 | Stacy | 358/194.1 X |
| 4,878,055 | 10/1989 | Kasahara | 358/194.1 X |
| 4,893,222 | 1/1990 | Mintzer | 362/109 |

Primary Examiner—Stephen F. Husar
Attorney, Agent, or Firm—Guy W. Shoup; B. Noel Kivlin

[57]   ABSTRACT

A remote control unit which is simple in structure and free from the possibility of disconnection and has a stabilized illumination function. The remote control unit comprises a body case having a recess and having a plurality of push-button switches disposed thereon, and a door mounted for pivotal opening and closing motion on the body case and having a plurality of push-buttons thereon in an opposing relationship to the push-button switches so that, when the door is closed, they are each operated by operation of a corresponding one of the push-buttons. The body case has a rising portion having a light admitting hole perforated in a side wall thereof adjacent the recess, and a light emitting element is accommodated in the rising portion. When the door is open, light emitted from the light emitting element and admitted into the recess through the light admitting hole is projected to display portions of the push-button switches, but when the door is closed, such light is introduced to display portions of the push-buttons on the door by way of a light conducting member provided on a rear face of the door.

4 Claims, 2 Drawing Sheets

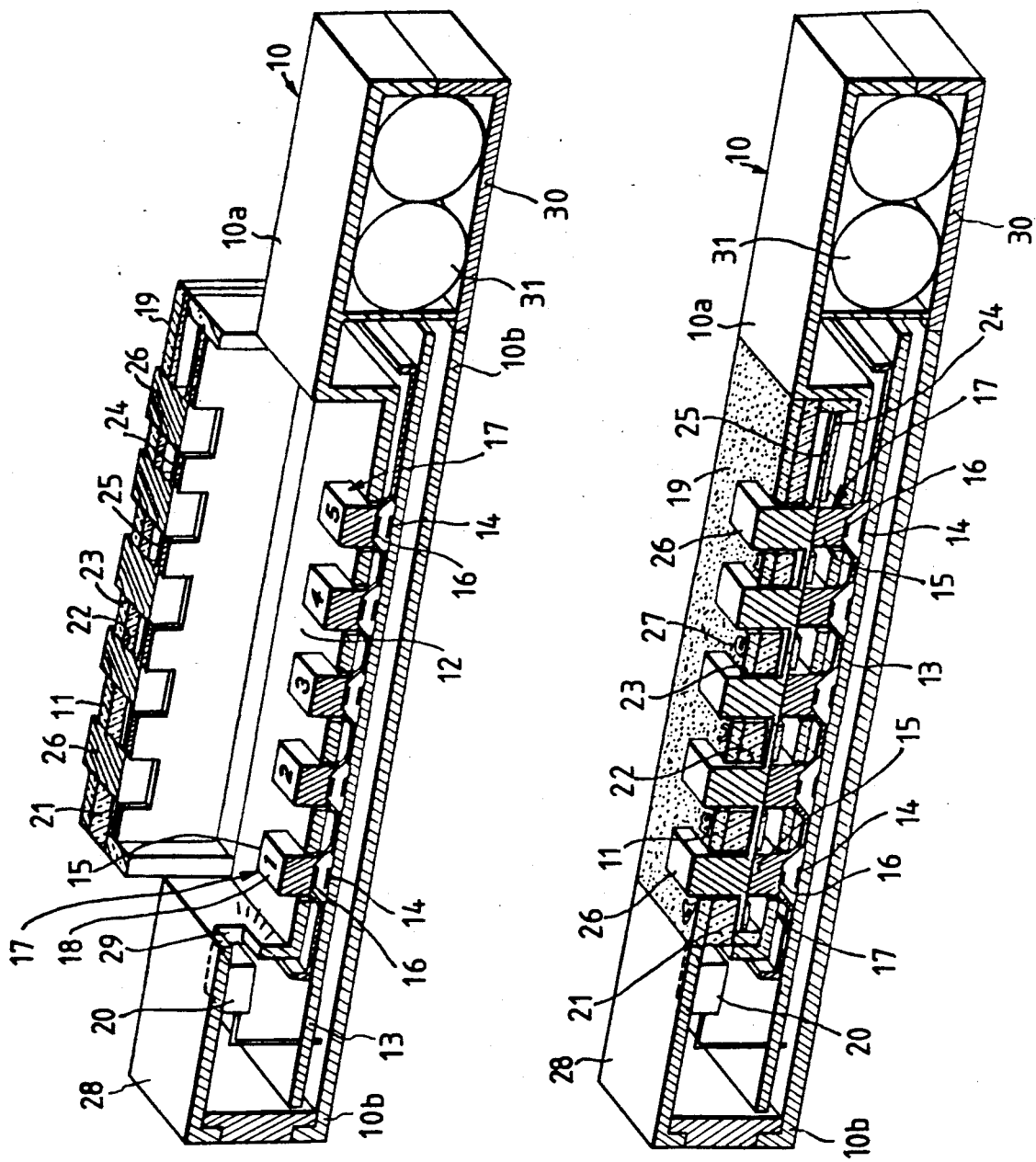

REMOTE CONTROL UNIT

BACKGROUND OF THE INVENTION

1. Field of the Invention

This invention relates to a remote control unit, and more particularly to an illumination device for a display section of a remote control unit.

2. Description of Related Art

Remote control units are conventionally known which include a mode change-over switch for the change-over, for example, between a channel changing over mode of a television broad and a video apparatus operation mode for different video apparatus functions such as recording, reproduction, fast feeding and rewinding, and a plurality of push-button switches common to the two modes and wherein operation of that one of two apparatus, for example, a television set and a video tape recorder, which is specified by way of the mode change-over switch is alternatively selected by the common push-button switches at a location remote from the apparatus.

FIGS. 3 and 4 show an exemplary one of such conventional remote control units. Referring to FIGS. 3 and 4, the conventional remote control unit shown includes a body case 1, and a plurality of push-buttons 2 for push-button switches 3 built in the case 1. The push-buttons 2 individually have channel number indicating symbols 4 applied to display portions of surfaces thereof. A door 5 is mounted for pivotal motion on the body case 1 between an open position in which the push-buttons 2 are exposed outside as seen in FIG. 3 and a closed position in which the push-buttons 2 are covered with the door 5 as seen from FIG. 4. The door 5 has a plurality of push-buttons 6 for the change-over of operation of a video tape recorder provided thereon corresponding to the push-buttons 2 for the push-button switches 3 as seen in FIG. 4. Though not shown, the remote control unit includes a mode change-over switch for selecting one of a television broadcast receiving mode and a video tape recorder mode in response to opening or closing of the door 5. When the television broadcast receiving mode is to be selected, first the door 5 will be opened to select the television broadcast receiving mode, and then one of the push-buttons 2 for the push-button switches 3 will be depressed to designate a channel number. On the other hand, when recording, reproduction, fast feeding or rewinding of the video tape recorder is to be performed, the door 5 will first be closed to select the video tape recorder mode, and then one of the push-buttons 2 for the push-button switches 3 will be depressed by way of an opposing or corresponding one of the push-buttons 6 provided on the door 5 to select a desired function.

By the way, where the remote control unit has an illumination function for facilitating, at a dark place, operation of the remote control unit which has such opening and closing door as described above, a light emitting element such as an LED (light emitting diode) is provided in the inside of each of the door 5 and the body case 1. With such remote control unit, power must be supplied from a battery accommodated in the body case 1 to the light emitting element in the inside of the door 5 by way of a flexible printed circuit cable. Accordingly, the remote control unit is complicated in structure and expensive. Besides, when the door 5 is opened or closed, the flexible printed circuit cable often interferes with the door 5, and repetitive use of the remote control unit for a long period of time likely causes disconnection of the flexible printed circuit cable.

SUMMARY OF THE INVENTION

It is an object of the present invention to provide a remote control unit which is simple in structure and free from the possibility of disconnection and has a stabilized illumination function.

In order to attain the object, according to the present invention, there is provided a remote control unit which comprises a body case having a recess defined by an upper wall thereof and having a rising portion provided by provision of the recess, a plurality of push-button switches provided for individual manual operation on the upper wall thereof at the recess, a door mounted for pivotal motion on the body case between a closed position in which the door is fitted in the recess and covers over the push-button switches and an open position in which the push-button switches are capable of being manually operated, a plurality of push-buttons disposed for individual manual operation on the door in such a manner as to oppose, when the door is in the closed position, to the push-button switches so that each of the push-button switches may be operated by operation of a corresponding one of the push-buttons, the rising portion of the body case having a light admitting hole perforated in a side wall thereof adjacent the recess, a light emitting element accommodated in the rising portion of the body case such that light emitted therefrom may be admitted into the recess through the light admitting hole so that, when the door is in the open position, such light may be projected to display portions of the push-button switches, and a light conducting member provided on a rear face of the door for introducing, when the door is in the closed position, light emitted from the light emitting element and admitted by way of the light admitting hole into the recess to display portions of the push-buttons on the door.

With the remote control unit, since the display portions of the push-button switches on the body case and the display portions of the push-buttons on the door can be illuminated by light from the single or common light emitting element, the number of light emitting elements is minimized, which achieves reduction of the production cost as much. Further, since the remote control unit does not require such a member for the electric connection between the body case and the door as a flexible printed circuit cable, it is simplified in entire structure and is free from a problem of disconnection or breakage of a conductor which may take place after a large number of repetitive opening and closing operations of the door for a long period of time. Consequently, a stabilized illuminating function is assured.

The above and other objects, features and advantages of the present invention will become apparent from the following description and the appended claims, taken in conjunction with the accompanying drawings.

BRIEF DESCRIPTION OF THE DRAWINGS

FIG. 1 is a perspective cross sectional view of a remote control unit with a door opened showing a preferred embodiment of the present invention;

FIG. 2 is a similar view to FIG. 1 but showing the remote control unit with the door closed;

DETAILED DESCRIPTION OF THE PREFERRED EMBODIMENT

Figure 3:
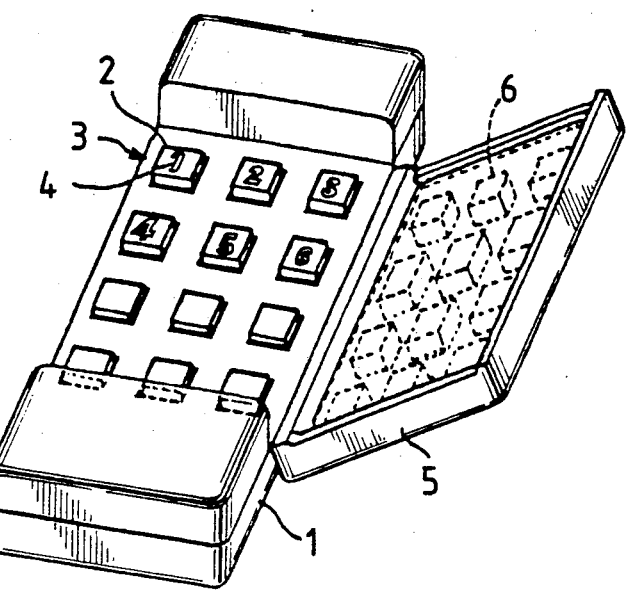
FIG. 3 is a perspective view showing a conventional remote control unit with a door opened.

Referring to FIGS. 1 and 2, there is shown a remote control unit to which the present invention is applied. The remote control unit shown includes a body case 10 consisting of an upper case 10a and a lower case 10b. A door 11 is mounted for pivotal motion on the body case 10 by a suitable means such as a hinge, and the upper case 10a of the body case 10 has a recess 12 formed on an upper wall thereof for receiving the door 11 therein. A printed circuit board 13 is disposed on the lower case 10b of the body case 10, and a plurality of fixed contacts 14 are provided on an upper surface of the printed circuit board 13. A plurality of push-buttons 15 made of an elastic material such as rubber are mounted on the printed circuit board 13 and fitted in holes perforated in a portion of the upper case 10a of the body case 10 at the recess 12 such that they extend upwardly above the portion of the upper case 10a. A movable contact 16 is provided on a lower face of each of the movable contacts 15 opposing to a fixed contact 14 such that, when the push-button 15 is depressed, the movable contact 16 thereon is contacted with the opposing fixed contact 14 so that a push-button switch 17 constituted from the movable contact 16 and the opposing fixed contact 14 is switched on, but when the push-button 15 is released, it is returned by its own resiliency to its normal position at which the movable contact 16 thereof is spaced away from the opposing fixed contact 14 and the push-button switch 17 is in an off state. The push-button switches 17 are provided for the change-over of a channel number of a television broadcast and individually have symbols 18 representative of television channel numbers applied to display portions of surfaces thereof.

The door 11 is made of a light transmitting resin material and has a light intercepting paint layer 19 applied to a front or upper surface thereof as indicated by a matted portion in FIG. 2 while a light conducting member 21 is provided on a rear surface of the door 11 such that it is inclined upwardly to decrease the thickness thereof as the distance from a light emitting element 20 which will be hereinafter described increases. A plurality of push-buttons 26 extend upwardly through holes 22 and 23 perforated in the light conducting member 21 and door 11, respectively, and are connected to each other by way of connecting portions 25 at which they are supported on a support late 24. Here, the push-buttons 26 are provided for the change-over of operation of a video apparatus, and symbols 27 of recording, reproduction, fast feeding, rewinding and so forth are provided at display portions of a surface of the door 11 adjacent the push-buttons 15. The symbols 27 are formed by cutting the light intercepting paint layer 19 by means of a laser beam.

A rising portion 28 is provided on one side of the recess 12 of the upper case 10a of the case body 10 by provision of the recess 12, and the aforementioned light emitting element (LED) 20 is accommodated in the rising portion 28. The rising portion 28 of the upper case 10a has a light admitting hole 29 formed in a wall thereof adjacent the recess 12 such that it extends to the recess 12. Though not shown, also a mode change-over switch is provided for changing over the mode of the remote control unit between different modes such as a television broadcast receiving mode and a video apparatus operation mode in response to opening or closing of the door 11. An accommodating box 30 for a battery 31 for supplying power to the light emitting element 20 is provided at a portion of the body case 10 remote from the rising portion 28 with respect to the recess 12.

In operation, when the door 11 is open, the television broadcast receiving mode is selected by way of the mode change-over switch. In the television broadcast receiving mode, a channel of television broadcast to be received is selected by selectively depressing one of the push-buttons 15 of the push-button switches 17. Meanwhile, light emitted from the light emitting element 20 is admitted into the recess 12 by way of the light admitting hole 29 of the rising portion 28 of the case body 10 to illuminate the symbols 18 of the display portions of the surface of the push-buttons 15.

Then, if the door 11 is closed and fitted into the recess 12 of the upper case 10a of the case body 10, then the mode is changed over to the video apparatus operation mode by the mode change-over switch. Then, if one of the push-buttons 26 on the front surface of the door 11, then a corresponding one of the push-buttons 15 for the push-button switches 17 is operated by the push-button 26 to select one of the functions of the video apparatus including recording, reproduction, fast feeding and rewinding. It is to be noted that, in this instance, light emitted from the light emitting element 20 is projected to the light conducting member 21 by way of the light admitting hole 29 of the rising portion 28 of the upper case 10a of the body case 10, and reflected light from the light conducting member 21 passes through the symbols 27 provided at the display portions adjacent the push-buttons 26 and goes out of the remote control unit. Consequently, the operator can discriminate the functions of the push-buttons 26 even at a dark place.

Figure 4:
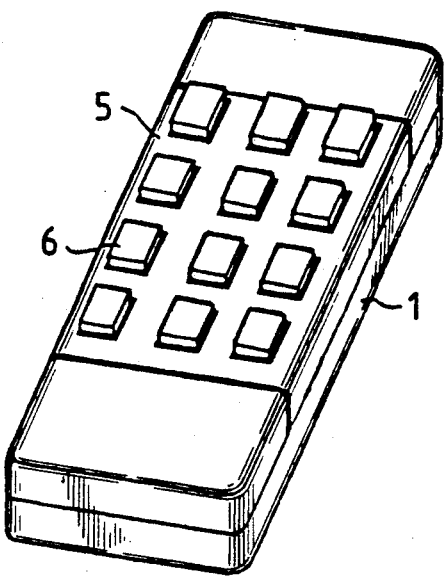
FIG. 4 is a similar view to FIG. 3 but showing the conventional remote control unit with the door closed.

The remote control unit of the present embodiment has such construction as described above, and since the push-buttons 15 on the surface of the upper case 10a and the display portions of the push-buttons 26 can be illuminated by light from the single or common light emitting element 20. Accordingly, the number of such light emitting elements is reduced by one comparing with such conventional remote control unit as described hereinabove with reference to FIGS. 3 and 4. Further, since the light emitting element 20 need not be provided on the door 11, no flexible printed circuit cable need be provided for the interconnection between the body case 10 and the door 11. Consequently, the structure of the remote control unit is simplified, and the possibility that disconnection by breakage of such flexible printed circuit cable may take place is eliminated. Accordingly, the remote control unit has a stabilized illuminating function.

Having now fully described the invention, it will be apparent to one of ordinary skill in the art that many changes and modifications can be made thereto without departing from the spirit and scope of the invention as set forth herein.

What is claimed is:

1. A remote control unit, comprising a body case having a recess defined by an upper wall thereof and having a rising portion provided by provision of said recess, a plurality of push-button switches provided for individual manual operation on said upper wall thereof at said recess, a door mounted for pivotal motion on said body case between a closed position in which said door is fitted in said recess and covers over said push-button switches and an open position in which said push-button switches are capable of being manually operated, a plurality of push-buttons disposed for individual manual operation on said door in such a manner as to oppose, when said door is in the closed position, to said push-button switches so that each of said push-button switches may be operated by operation of a corresponding one of said push-buttons, said rising portion of said body case having a light admitting hole perforated in a side wall thereof adjacent said recess, a light emitting element accommodated in said rising portion of said body case such that light emitted therefrom may be admitted into said recess through said light admitting hole so that, when said door is in the open position, such light may be projected to display portions of said push-button switches, and a light conducting member provided on a rear face of said door for introducing, when said door is in the closed position, light emitted from said light emitting element and admitted by way of said light admitting hole into said recess to display portions of said push-buttons on said door.

2. A remote control unit according to claim 1, wherein the rear face of said light conducting member is inclined toward a front surface of said door so as to decrease the thickness of said light conducting member as the distance from said light emitting element increases.

3. A remote control unit according to claim 1, wherein an accommodating box is formed by a portion of said body case remote from said rising portion with respect to said recess, and a battery for supplying power to said light emitting element is accommodated in said accommodating box.

4. In a remote control unit which includes a body case having a plurality of push-button switches provided on a surface thereof, a door mounted for pivotal opening and closing motion on said body case and having a plurality of push-buttons disposed thereon corresponding to said push-button switches, and a mode change-over switch operable in response to opening or closing of said door for setting, when said door is open, a first mode in which a function is selected by selective operation of said push-button switches but setting, when said door is closed, a second mode in which a function is selected by operation of one of said push-buttons provided on said door to operate a corresponding one of said push-buttons, the improvement wherein said body case has a recess defined by an upper wall thereof for receiving said door therein and has a rising portion formed thereon adjacent said recess, and said rising portion has a light admitting hole perforated in a side wall thereof adjacent said recess and a light emitting element is accommodated in said rising portion such that light emitted therefrom may be admitted into said recess through said light admitting hole such that, when said door is open, such light may be introduced to display portions of said push-button switches, but when said door is closed and received in said recess, such light may be introduced to display portions of said push-buttons on a front surface of said door by way of a light conducting member which is provided on a rear face of said door.

* * * * *